Jan. 6, 1970  G. T. BAKER  3,488,091
MANUALLY MOVABLE TRANSPORTING VEHICLE
Original Filed March 22, 1967  3 Sheets-Sheet 1
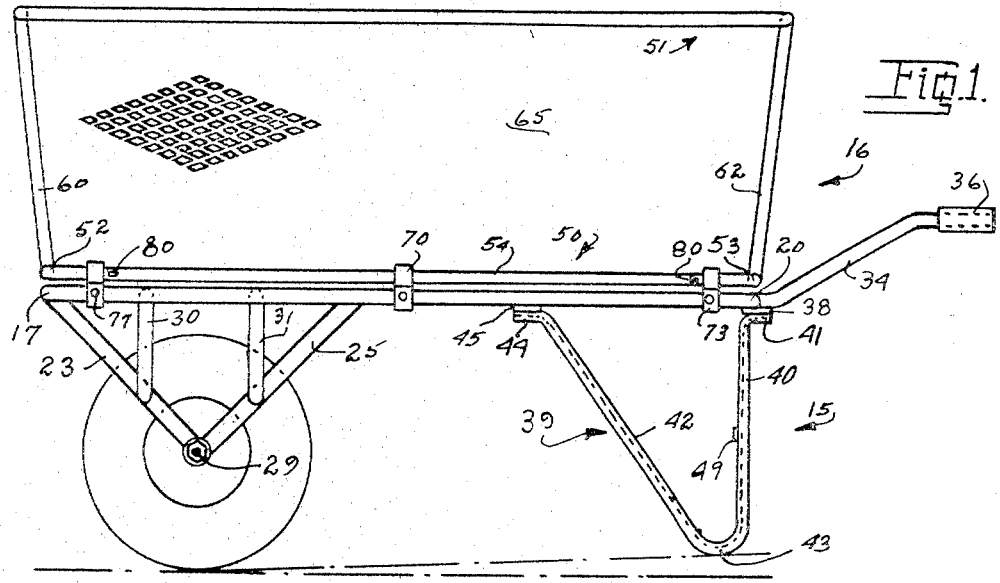
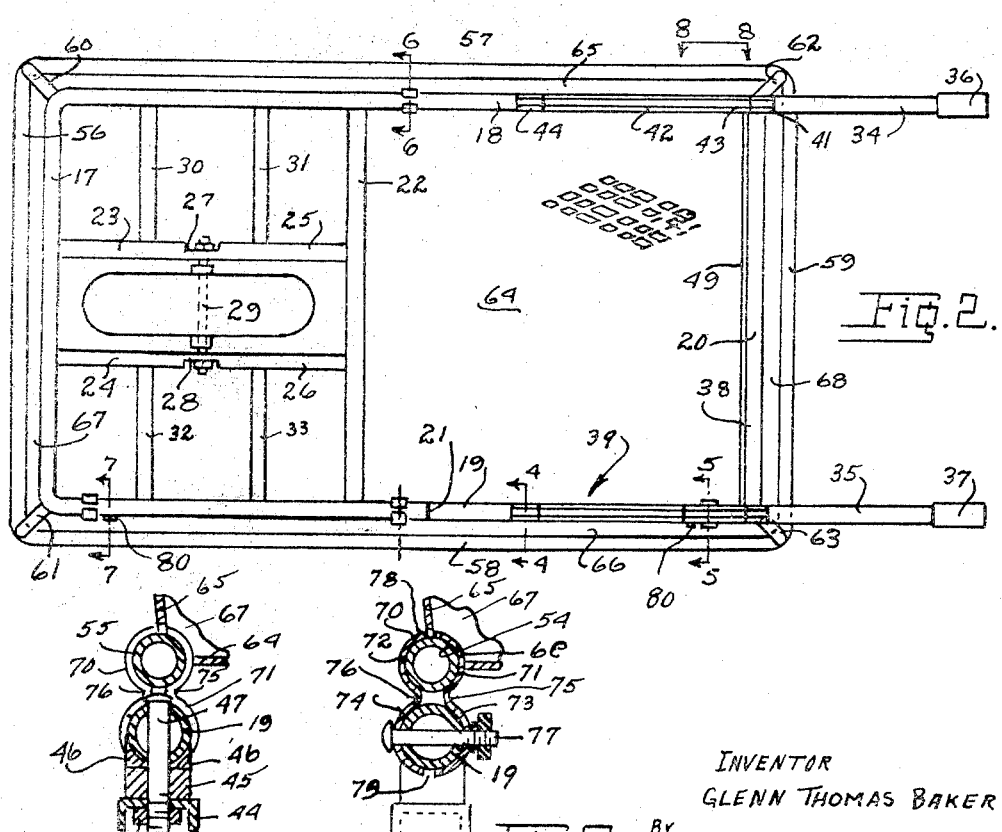
INVENTOR
GLENN THOMAS BAKER
By Joseph A. Pave
Attorney INVENTOR
GLEEN THOMAS BAKER
By
Joseph A. Rave
Attorney

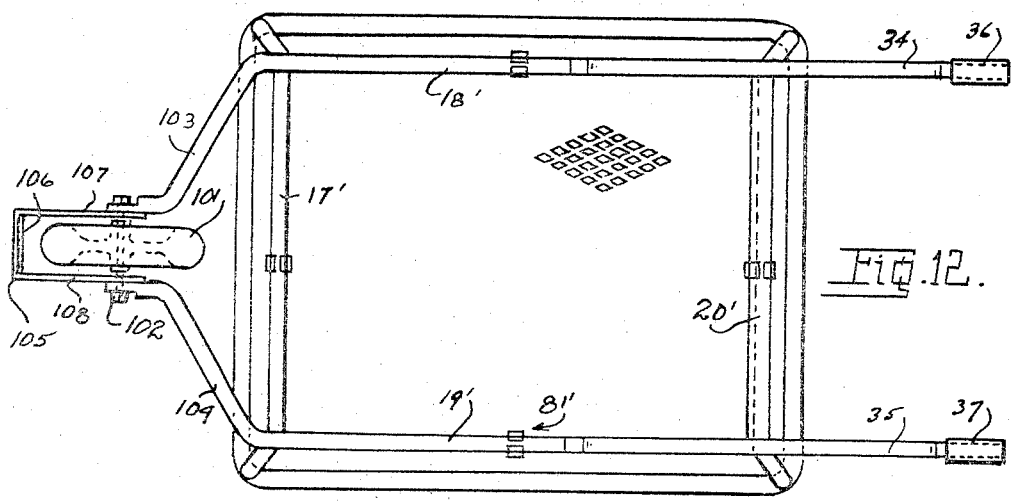
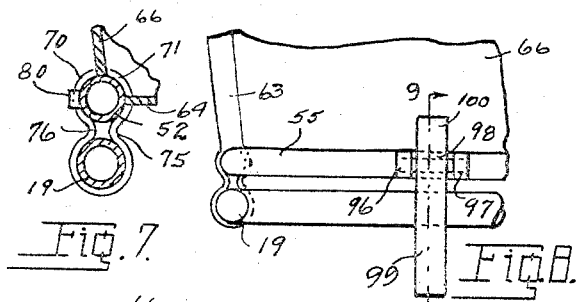
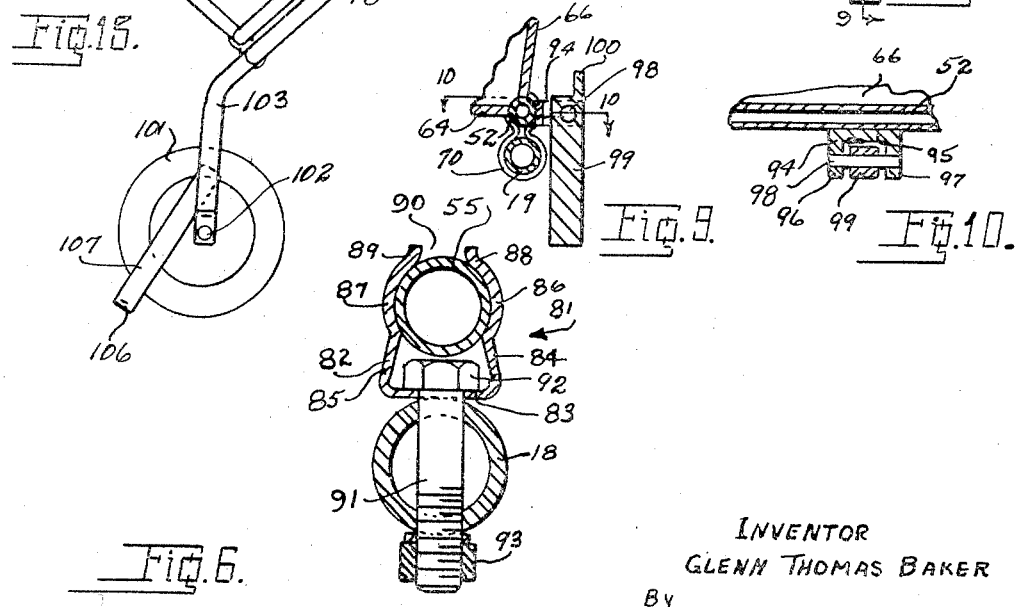

United States Patent Office 3,488,091
Patented Jan. 6, 1970

3,488,091
MANUALLY MOVABLE TRANSPORTING VEHICLE
Glenn Thomas Baker, 6235 Crestview Place, Cincinnati, Ohio 45230
Continuation of application Ser. No. 625,054, Mar. 22, 1967. This application Nov. 8, 1968, Ser. No. 774,239
Int. Cl. B62b 1/00, 3/00
U.S. Cl. 298—3     11 Claims

ABSTRACT OF THE DISCLOSURE

A manually operable wheeled vehicle including a basket movable with and relative to a supporting frame. Stationary three point supporting means including a single wheel and downward legs respectively laterally disposed with respect to the wheel. Handle means outwardly projecting from the vehicle at the end thereof downwardly of which the supports project.

The movable basket is releasably held on the supporting frame to be entirely removed from said supporting frame, even though the contents of the basket may be discharged without removal.

---

This invention relates to improvements in a manually movable transporting vehicle including a downwardly projecting freely rotatable wheel at one end and laterally spaced supporting legs at the other.

SUMMARY OF THE INVENTION

This application is a continuation of my pending application Ser. No. 625,054 for Manually Transporting Vehicle and filed on Mar. 22, 1967.

An object of this invention is the provision of a manually actuatable vehicle which includes a container movable relative thereto for disposing of the contents thereof and which container is rectangular in area and of considerable depth.

Another object of this invention is the provision of a vehicle for transporting materials including a wheel at one end and manually graspable handle at the other together with support means between the handle and wheel cooperating with one another to maintain the vehicle in a stationary upright position.

A further object of this invention is the provision of a hand operable vehicle in which the container is movable, either entirely or partially, with respect to the support thereof, for discharging the contents of the container.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:

FIG. 1 is a side elevational view of one form of a wheeled vehicle of the present invention.

FIG. 2 is a bottom plan view of the vehicle as disclosed in FIG. 1.

FIG. 4 is an enlarged, fragmentary, sectional view of a part of the vehicle as seen from line 4—4 on FIG. 2.

FIG. 5 is an enlarged, fragmentary, sectional view, similar to FIG. 4, taken in a plane behind FIG. 4 as seen from line 5—5 on FIG. 2.

FIG. 6 is an enlarged, fragmentary, sectional view through another point of the vehicle as seen from line 6—6 on FIG. 2; FIG. 6 is also an enlarged, sectional view through a portion of a modified form of the vehicle as disclosed in FIG. 11, said view being as seen in line 6—6 on said FIG. 11.

FIG. 7 is an enlarged, sectional view taken through a plane ahead of that of FIG. 4, and as seen from line 7—7 on FIG. 2.

FIG. 8 is an enlarged, fragmentary, elevational view of a portion of FIG. 2, as seen when looking from line 8—8 adjacent said FIG. 2.

FIG. 9 is a fragmentary, sectional view through the portion of FIG. 8 as seen from line 9—9 on said FIG. 8.

FIG. 10 is a fragmentary, sectional view of FIG. 9 as seen from line 10—10 on said FIG. 9.

Figure 11:
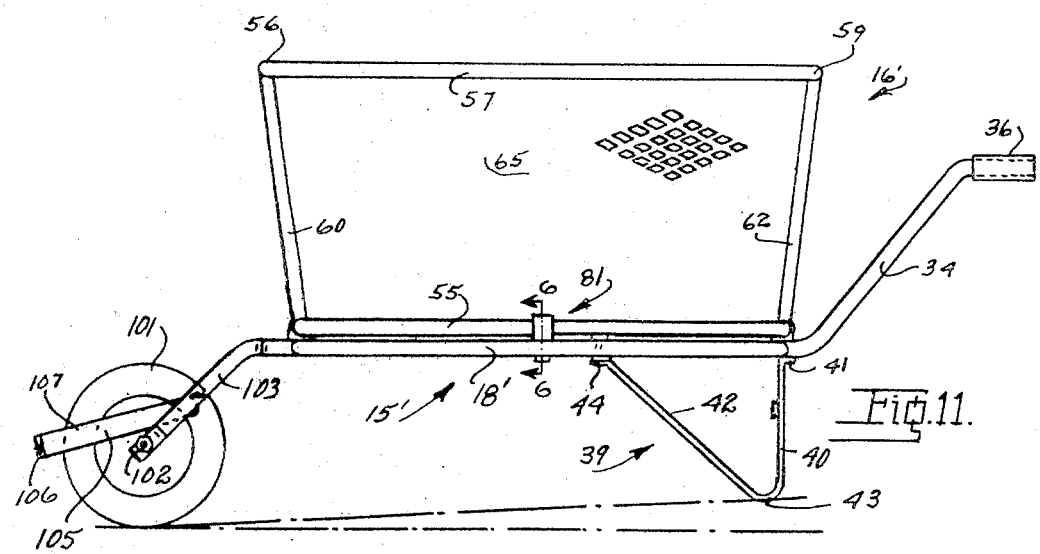

FIG. 11, as noted above, is a side elevational view of a modified form of the vehicle of the present invention.

FIG. 12 is a bottom plan view of the modified vehicle of FIG. 11.

FIG. 13 is a fragmentary, elevational view of a portion of FIG. 11 showing the modified form of the vehicle in operation.

Throughout the several views of the drawings similar reference characters are employed to denote the same or similar parts.

As noted above this invention relates to a manually operable vehicle for transporting relatively light though bulky material from place to place, such as, around a race track or the like, manure; in the yard or grounds of an estate, the transportation of leaves, small twigs, cut grass and similar debris; and the vehicle of the present invention may be employed in gathering paper, leaves and other debris from streets and sidewalks and the like and transporting same to central place of receipt of such material, such as motor operated trucks.

Specifically, the present invention includes a supporting frame indicated in general by the reference numeral 15 on which is mounted a container, which could readily be described as a large basket, indicated in its entirety by the reference numeral 16.

Figure 3:
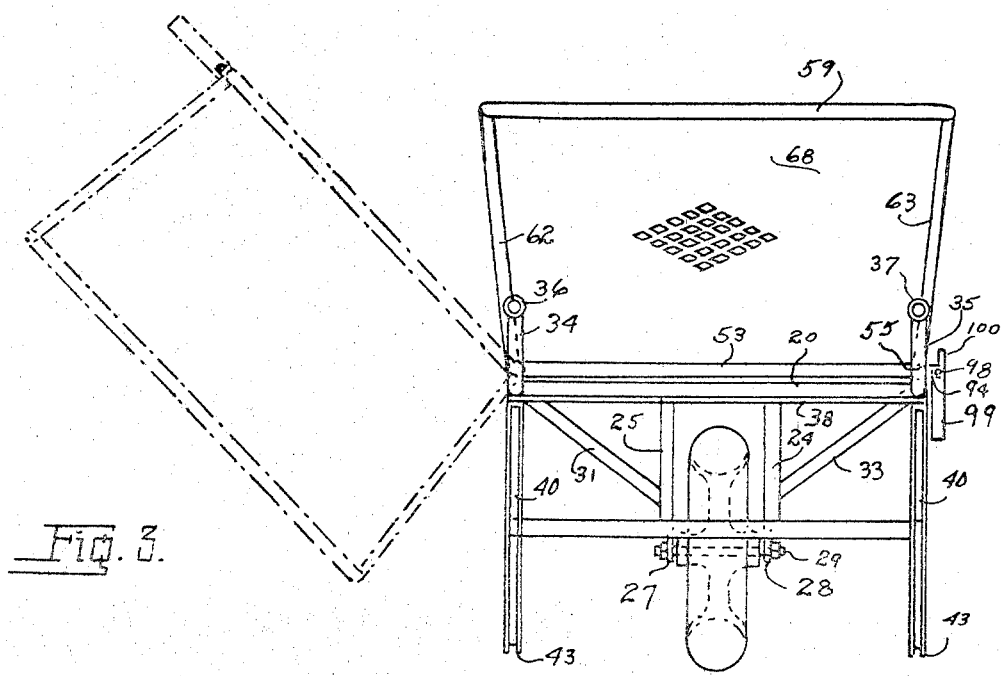
FIG. 3 is an end elevational view of the vehicle of FIGS. 1 and 2 and showing the operation of the vehicle.

The frame 15 of the vehicle, illustrated in FIGS. 1, 2 and 3, is rectangular in plan and includes a front transverse member 17 from the ends of which rearwardly project side members 18 and 19 in turn having their rear ends connected by a transverse rear or back member 20. The said frame members 17, 18, 19 and 20 are each formed of pipe or tubing, preferably aluminum, and in one continuous piece with the adjacent ends of the pipe being joined and secured, or welded, to one another, as at 21 in FIG. 2. It is to be understood, however, that the said frame members 17, 18, 19 and 20 may be individually cut to size and secured in position, or they may be formed in any other manner, and the ends joined to one another in the manner of the joint 21, supra.

The frame sides members 18 and 19, as seen in FIG. 2, are joined to one another by a transverse member 22, again of aluminum pipe or tubing intermediate the front member 17 and rear or back member 20, and which transverse member has its end suitably welded or otherwise secured to the said side members pipes or tubing 18 and 19. At the forward end of the said supporting frame 15 there is angularly, downwardly, inwardly depending from the front end member 17 supports or arms 23 and 24 and in alignment therewith and extending downwardly and outwardly from the intermediate transverse brace 22 are supports or arms 25 and 26. The inner ends 27 of the braces 23 and 25 and the similar inner ends 28 of the braces 24 and 26 are joined to supply a support for a wheel axle 29. In the manner of the construction above the supports or arms 23 and 25 may be formed of a single member, aluminum pipe or tube, with their inner ends joined to form a V; similarly the supports or arms 24 and 26 may be formed of a single aluminum tube or pipe and again formed to a V, laterally or transversely, in opposition to the V frame 23–25.

The said longitudinal and axle bearing V frame 23–25, have from each part thereof a frame member or strut 30 and 31 having their inner and lower ends, respectively, secured to the V frame leg 23 and V frame leg 25, while the outer ends of these braces, upwardly and outwardly, see FIG. 3, project for securement by welding or otherwise to the supporting frame side member 18. Similarly, axle bearing V frame 24–26 have from each leg, respectively, upwardly and outwardly projecting brace struts 32 and 33 extending to the longitudinal frame side member 19 where they are again secured by welding or the like, as seen in FIGS. 2 and 3.

The supporting frame 15 beyond the rear end of the side frames members 18 and 19 have secured thereto handles 34 and 35 each of which, as seen in FIG. 1, upwardly extends to respectively have telescoped on their free ends grips 36 and 37. The said handles inner ends are connected to one another by a transverse bar 38 which may be a tube or pipe but preferably is a flat bar.

Extending downwardly from the supporting frame 15, particularly substantially at the outer ends of the supporting frame side members 18 and 19, are similarly shaped supports, each indicated, in general, by the reference numeral 39. As seen in FIGS. 1, 2 and 3 each of said supports is formed of a continuous section of channel metal, preferably, aluminum, including a vertical portion 40 having at its upper end an outwardly extending finger 41. As seen in FIG. 1 the finger 41 may have a length equal to the width of the transverse bar 38, and against which the outer surface of the leg channel member is welded or otherwise secured. The support 39 at the bottom of its upright portion or leg 40 includes an upwardly forwardly projecting leg portion 42 with said leg portions 40 and 42 preferably connected with one another by a continuous bend 43. By this construction a smooth rounded surface is provided each supporting member 39 so that in setting the vehicle down a smooth rounded surface engages the ground or the like on which the vehicle is being used. The upper end of the support leg 42, similar to the upper end of the support leg 40, is outwardly bent to form a finger 44 which lies against a block 45 in turn lying against the under surface of a frame side member 19 or 18 and which block 45 and side member are secured to one another by welding 46 (see FIG. 4). The said support leg finger 44 is secured in place by a bolt 47 extending through the frame side 19 or 18, block 45 and finger 44 to receive a nut 48 on the under side of the said support leg finger 44.

To further stabilize the supports 39 with respect to one another, and the vehicle frame as a whole, the said vertical portions or legs 44 of the said supports 39 are joined to one another by a transverse bar 49 and which has its opposite ends respectively connected with the vertical leg 40 of the said supports.

Disposed above the supporting frame, as noted above, is the container or basket including a pair of spaced horizontal frames respectively indicated in their entirety by the reference numerals 50 and 51. The lower rectangular frame 50 is in substantially all respects a duplicate of the supporting frame and includes a front end member 52, corresponding to and above the supporting frame front end members 17; a front transverse member 53 corresponding to and above the supporting frame front end 20 and which front and rear frame members 52 and 53 have their opposite ends, respectively, connected with one another by container or basket lower frame members 54 and 55, respectively, corresponding to and above the supporting frame side members 18 and 19.

The upwardly spaced rectangular frame 51 is slightly longer and wider than the lower frame 50 with said frame 51 including a front member 56, from the ends of which rearwardly project side members 57 and 58, and with the forward ends of the said side members 57 and 58 being joined to one another by a rear transverse member 59. The corners of the container or basket upper frame 51 as well as the corners of the container or basket lower frame 50 are rounded and projecting from said lower to the upper corners are corner posts 60, 61, 62 and 63 and which posts outwardly and upwardly extend from the lower frame 50, the outward angular projection of the corner posts being necessary due to the difference in area of the said lower and upper frames.

Extending between the container or basket lower frame 50 side and end members is a container or basket bottom plate 64 having the edges thereof secured or welded to the said sides and end frames as illustrated in FIG. 9 in connection with the container or basket lower frame side member 55. Similarly extending between the corner posts, corner posts 60 and 62, and between the container or basket lower frame side member 55 and opposed container or basket upper frame side member 57 is a container or basket side 65. An opposed container or basket side 66 is similarly connected with the end post and top and bottom frame members for the container or basket opposite side and, similarly, again container or basket front member 67, and container or basket back member 68 is similarly secured to the front and back corner posts and top and bottom members.

The basket 15, as illustrated in FIGS. 1, 2 and 3, has the basket lower frame side member 54 connected with the supporting frame side member 19 by a plurality, three as illustrated, connecting clamps such as illustrated in cross-section in FIG. 5. These clamps comprise a pair of opposed plates 69 and 70 each identical with the other and each plate including an outward circular portion 71 and 72, respectively, bent to the radius of the container or basket lower side member 54 but with a vertical dimension less than the diameter of said side member. Each clamp member 69 and 70 is further provided at its opposite ends with a circular portion 73 and 74 to a radius equal to the supporting frame and, again, to a length less than the diameter of the side member 19. The clamp plate 69 has its semi-circular portions 71 and 73 joined to one another by a reversely curved portion 75 and the clamp plate 70, similarly, has its circular portion 72 and 74 connected to one another by a reversely curved portion 76.

The clamp members 69 and 70 are adapted to be positioned with their depressed portions 71 and 72, respectively, and 73 and 74, respectively, opposite one another and on opposite sides of the said frame members 54 and 19. The said clamp members 69 and 70 are secured in this position by a bolt and nut 77 extending through their curved portions 73 and 74 and the supporting frame side member 19. With the parts thus positioned the clamp members 69 and 70 have a space 78 between their upper free ends and a similar space 79 between their lower free ends. The said clamp members further will prevent laterally or outwardly movement of the frame side members 54 and 19 with respect to one another. At the same time the clamp members will permit the rotation of the container or basket side member 54 in the said clamps while definitely preventing such rotation between the clamp members portions 73 and 74 and the supporting frame side member 19.

In order to prevent axial or longitudinal movement of the container or basket side member 54 in the clamps the said basket lower side member 54 has projecting therefrom a lug 80 adjacent one of said clamps and a similar lug 80 adjacent a second of said clamps with the said lugs being on opposite sides of its clamp and thereby prevent movement in either longitudinal direction.

A somewhat similar, though resilient, arrangement is provided for the other side of the container or basket indicated in its entirety by the reference numeral 81 and illustrated in detail in FIG. 6, for retaining said other side of the container or basket on the supporting frame 15 during the filling or loading thereof. The said resilient basket retaining means comprises a clip 82 somewhat U-shaped in cross-section and including a base 83 from the opposite sides, or ends, of which upwardly project arms 84 and 85. The arms 84 and 85 downwardly of their upper free ends are provided with outwardly arched seats 86 and 87 each to a radius substantially equal to that of the container or basket lower frame 55 and with said arms 86 and 87 having its upper end outwardly curved as at 88 and 89 with a space 90 therebetween.

The said clip 82 is secured to the supporting frame side member tube or bar 18 by a bolt 91 which passes through aligned apertures in the clip base 83 and said supporting frame side member 18. The securing bolt 91 has its head 92 on the upper or inner surface of the base 83 and receives a securing or clamping nut 93 on its threaded end beyond the said supporting frame side member 18.

In effect the clip 82 is a spring clip of such resilience that it normally retains the container or basket side member 55 against displacement but permits the said side member to be forced outwardly of the said clip arms 86 and 87 through the space 90. The said container or basket can be shifted from its receiving position in solid lines in FIG. 3 to its "dumping" or discharge position, illustrated in phantom lines in said figure. Reverse actuation of the container or basket will force the side member 55 thereof back through the clip opening 90 to the solid line position illustrated therefor in FIG. 6.

In order to actuate the basket to its dumping or discharge position and return the said basket or container is provided at one of its corners, the rear lower corner as seen in FIG. 2, on the side member 55 with a U-shaped block 94, see FIGS. 8, 9 and 10, and which block has its base 95 welded or otherwise secured to the said container or basket lower side member 55 and with said block having projecting from its ends arms 96 and 97. The arms 96 and 97 near their outer ends are provided with aligned apertures for a pivot pin 98 which extends through an aperture in a handle member 99. The handle member 99 normally depends vertically of its mounting as shown in FIGS. 8 and 9 but is operable to an outward position as shown in phantom lines in said FIG. 9.

The handle or operating member 99 has upwardly or inwardly projecting therefrom a finger 100 which, when in its lifting or operating position, engages the upper surface of the attaching block 94 as well as the upper surface of the basket or container lower side member 55 for disengaging the said side member from the securing clip 81 and then actuating the container or basket from its solid line position in FIG. 3 to the phantom line position thereof and return.

The modified vehicle of the persent invention illustrated in FIGS. 11, 12 and 13 is, in reality, merely a smaller capacity version than the structure illustrated in FIGS. 1, 2 and 3.

This modified construction comprises a container or basket indicated in general by the reference numeral 16' and comprises substantially the same elements as the container or basket above described and indicated by the reference numeral 16. The chief difference between the said containers or baskets 16 and 16' is that the basket or container 16 has a capacity of 12.5 cubic feet or ten bushels while the container or basket 16' has a capacity of 7.5 cubic feet or six bushels. With the smaller capacity container or basket it can be completely removed from the supporting frame indicated in general by the reference numeral 15'. In order to effect such an arrangement each of the supporting frame front side or end 17', the longitudinal side frame members 18' and 19' and the rear or back member 20' are connected with the basket through a spring clip arrangement 81' similar in all respects to the spring clip arrangement 81 above.

The chief distinction in the modified vehicle is that its supporting wheel 101 is rotatable on an axle 102 connecting a pair of arms 103 and 104 respectively forwardly of the supporting frame 15' and with said arms 103 and 104 being, in effect, continuations of the supporting frame sides 18' and 19'. This mounting of the wheel 101 on a supporting frame is quite similar to a wheel-barrow supporting frame which has its side members outwardly and rearwardly projecting from the supporting wheel beneath the container and which supporting frame members terminate in manually graspable handles. The vehicle of the present invention differs from the wheel-barrow in that its container is removable and resembles a basket while the wheel-barrow container is not.

In order to effect a dumping of the contents of the container or basket of the modified vehicle the said wheel supporting arms 103 and 104 have secured thereto a stop member or dumping bar 105 and which permits the vehicle, as a whole, to be actuated around the bar while dumping.

The said stop member or dumping bar 105 is U-shaped in plan and includes a base or front bar 106 rearwardly from the ends of which extend arms 107 and 108 which have their inner ends welded or otherwise secured to the inner surface of the wheel supporting arms 103 and 104. The stop member or dumping bar 105 is illustrated in operative position in FIG. 13 and wherein it is evident that the continued movement of the vehicle in a counter-clockwise direction around the wheel axle 102 will be arrested and the forward advance of the vehicle so that it will eventually wind up in a position for complete dumping or discharge from the container or basket.

It should be noted, as above, that instead of the container or basket 16' being discharged as illustrated in FIG. 13, it may be completely removed from the supporting frame 15' for purposes of dumping or emptying.

It should also be noted that the sides of either container 16 or 16' may, as illustrated in the drawings, be formed from expanded aluminum sheet for thereby providing containers or baskets that are quite light in weight per se, and yet will contain and permit movement of a relatively large quantity of material of, again, relatively light in weight but large in bulk.

It is also believed obvious that the container or basket 16 of the form of vehicle illustrated in FIGS. 1, 2 and 3 may also be such as to be entirely removed from its supporting frame simply by substituting the spring clip arrangement 81 for the relatively strict pivoting arrangement of FIG. 5.

From the foregoing it is believed now evident that there has been provided a manually movable vehicle that accomplishes the objects initially set forth.

What is claimed is:

1. In a manually movable transporting vehicle the combination of a rectangular supporting frame including longitudinal side members and connecting front and back members, a wheel substantially centrally, transversely, of the supporting frame longitudinal side members and adjacent the front transverse member, means carried by said supporting frame side members and front transverse members for securing said wheel in said operative position, depending support members from said longitudinal side members adjacent said rear transverse member and respectively located on each side of the wheel to form thereby a three point support for the supporting frame, a pair of handle members rearwardly of the rear transverse member spaced from one another laterally of the supporting frame, a container or basket including a bottom frame having longitudinal side members and connecting transverse front and back members located upwardly of or superimposed on the corresponding longitudinal side members and transverse front and back members of the supporting frame, said container or basket including upstanding side, front and back walls of expanded sheet metal and thereby resulting in a lightweight container or basket and releasable clip means between at least one of said superimposed supporting frame and container or basket frame members connecting and releasably retaining the said superimposed container or basket lower frame against displacement and wherein said container or basket is on the support frame during transportation of the supporting frame.

2. In a manually movable transporting vehicle as set forth in claim 1 characterized by, and means connecting the supporting frame and container or basket frame members opposite to those connected to one another by said releasable clips to permit the basket to be oscillated about the axis of said opposite supporting frame and container or basket members.

3. In a manually movable transporting vehicle as set forth in claim 1 characterized by, means connecting the supporting frame and container or basket frame members opposite to those connected to one another by said releasable clips to permit the basket to be oscillated about the axis of said opposite supporting frame and container or basket members, and said container or basket lower frame having a normally inoperative lever handle member pivoted to said container or basket lower frame movable into operative position for actuating the container or basket on its oscillatable connection with the supporting frame.

4. In a manually movable transporting vehicle as set forth in claim 1 characterized by, means connecting the supporting frame and container or basket frame members opposite to those connected to one another by said releasable clips to permit the basket to be oscillated about the axis of said opposite supporting frame and container or basket members including a pair of plates each having an arcuately formed portion inwardly of each end and which when arranged to have said arcuately formed portions opposite one another form a substantially circular seat or clamping portion and respectively engaging, simultaneously, the supporting frame and container or basket frame members for securing same to one another, and means permanently securing said plates to one another at points substantially intermediate their ends and thereby securing the said longitudinal frame and container or basket frame to one another yet permitting movement of the container or basket on the axis of one of said supporting frame and container or basket longitudinal member.

5. In a manually movable transporting vehicle as set forth in claim 1 characterized by, said releasable clip means for retaining the said supporting longitudinal member and container or basket longitudinal frame member to one another comprising a pair of clips each including inwardly of its end an outwardly arcuately formed portion and which arcuately formed portions form between them an arcuate seat respectively receiving the supporting frame longitudinal member and the container or basket lower frame longitudinal member, said clip ends for one of said longitudinal supporting frame member and container or basket bottom frame longitudinal member having its ends outwardly spaced whereby the same may be sprung to permit the separation of the said members while the remaining ends of said clips prevent displacement.

6. In a manually movable transporting vehicle as set forth in claim 1 characterized by, means connecting the supporting frame and container or basket frame longitudinal side members opposite to those connected to one another by said releasable clip means to permit the basket to be oscillated about the axis of said opposite supporting frame and container or basket longitudinal side members including a pair of plates each having an arcuately formed portion inwardly of each end and which when arranged to have said arcuately formed portions opposite one another form a substantially circular seat or clamping portion and respectively engaging, simultaneously, the supporting frame and container or basket frame longitudinal members for securing same to one another, and means permanently securing said plates to one another at points substantially intermediate their ends and thereby securing the said longitudinal frame and container or basket frame to one another yet permitting movement of the container or basket on the axis of one of said supporting frame and container or basket longitudinal member, said releasable clip means for retaining the said supporting longitudinal member and container or basket longitudinal frame member to one another comprising a pair of clips each including inwardly of its end an outwardly arcuately formed portion and which arcuately formed portion form between them an arcuate seat respectively receiving the supporting frame longitudinal member and the container or basket lower frame longitudinal member, said clip ends for one of said longitudinal supporting frame member and container or basket bottom frame longitudinal member having its ends outwardly spaced whereby the same may be sprung to permit the separation of the said members while the remaining ends of said clips prevent displacement.

7. In a manually movable transporting vehicle as set forth in claim 1 characterized by, and additional releasable spring means between one of the remaining opposed members of the supporting frame and container basket frame additionally releasably retaining the container or basket on the supporting frame but permitting complete removal of said container or basket from the said supporting frame.

8. In a manually movable transporting vehicle as set forth in claim 1 characterized by, said wheel including support members forwardly ahead of the supporting frame front member and having an axle at the outer lower ends of said support members, and whereby the container or basket is disposed between the said wheel and transverse supports.

9. In a manually movable transporting vehicle as set forth in claim 1 characterized by, said wheel including support members forwardly ahead of the supporting frame front member and having an axle at the outer lower ends of said support members, whereby the container or basket is disposed between the said wheels and transverse supports, and means carried by said forward wheel support members from a point above the wheel axle to a point forwardly of the wheel and whereby said vehicle supporting frame and its container or basket may be actuated about said means for dumping the container or basket to dispose the contents thereof forwardly and ahead of the wheel.

10. In a manually movable transporting vehicle as set forth in claim 1 characterized by, said supporting frame opposed side members each provided forwardly of its transverse front member with a forward, downward wheel supporting frame member, said foward, downwad wheel supporting frame member providing at their free ends with an axle for the depending wheel, and a U-shaped strut member including a transverse base member and arms at right angles to said base member with the free ends of the arms secured to the wheel supporting frame members at points upwardly of the axle to have the base member of the U-shaped struts forwardly ahead of the wheel and act as a bar and pivot on which the supporting frame and container or basket may be actuated during the dumping of the contents of the container or basket forwardly of the wheel.

11. In a manually movable transporting vehicle as set forth in claim 1 characterized by, said supporting frame opposed side members each provided forwardly of its transverse front member with a forward, downward wheel supporting frame member, said forward, downward wheel supporting frame member providing at their free ends with an axle for the depending wheel, a U-shaped strut member including a transverse base member and arms at right angles to said base member with the free ends of the arms secured to the wheel supporting frame members at points upwardly of the axle to have the base member of the U-shaped strut forwardly ahead of the wheel and act as a bar and pivot on which the supporting frame and container or basket may be actuated during the dumping of the contents of the container or basket forwardly of the wheel, and said releasable clip means retaining the container or basket to the supporting frame comprises spring clips adapted to be permanently secured to the supporting frame member and spring fingers between which the securing members of the transporting and basket frames are yieldably retained and the separation of which yielding fingers permits the removal of the container and its lower frame completely from the supporting frame.

References Cited

UNITED STATES PATENTS

| | | | |
|---|---|---|---|
| 1,544,769 | 7/1925 | Nalder | 298—3 |
| 2,262,903 | 11/1941 | Peterson | 298—3 |
| 2,389,574 | 11/1945 | Hulquist | 280—47.34 |
| 2,797,125 | 6/1957 | Vogler | 280—47.31 X |
| 3,255,905 | 6/1966 | Cochran | 280—47.26 X |

FOREIGN PATENTS

| | | |
|---|---|---|
| 462,240 | 7/1928 | Germany. |
| 639,019 | 6/1950 | Great Britain. |
| 943,660 | 12/1963 | Great Britain. |

RICHARD J. JOHNSON, Primary Examiner

U.S. Cl. X.R.

280—47.31